(No Model.)

B. P. GREEN.
PLANTER.

No. 395,655. Patented Jan. 1, 1889.

Witnesses.
A. Ruppert,
H. A. Daniels.

Inventor:
B. P. Green,
Per
Thomas P. Simpson,
Atty.

UNITED STATES PATENT OFFICE.

BENJAMIN P. GREEN, OF ETCHETAH, MONTANA TERRITORY.

PLANTER.

SPECIFICATION forming part of Letters Patent No. 395,655, dated January 1, 1889.

Application filed April 6, 1888. Serial No. 269,829. (No model.)

*To all whom it may concern:*

Be it known that I, BENJAMIN P. GREEN, a citizen of the United States, residing at Etchetah, in the county of Custer and Territory of Montana, have invented certain new and useful Improvements in Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a planter which will drop the seed in hills or drills which shall be in straight lines, so that the space between rows (of three feet apart or less) may be easily worked with a horse and without tearing up any of the plants.

Figure 1:
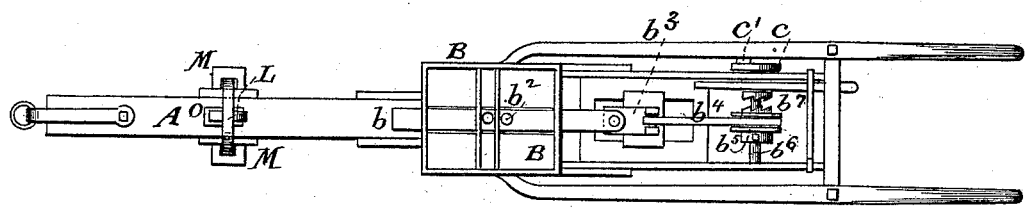
Figure 2:
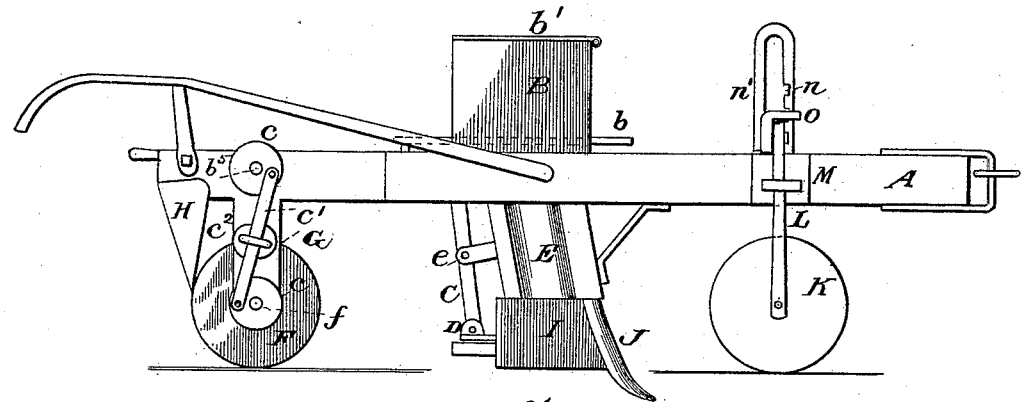
Figure 3:
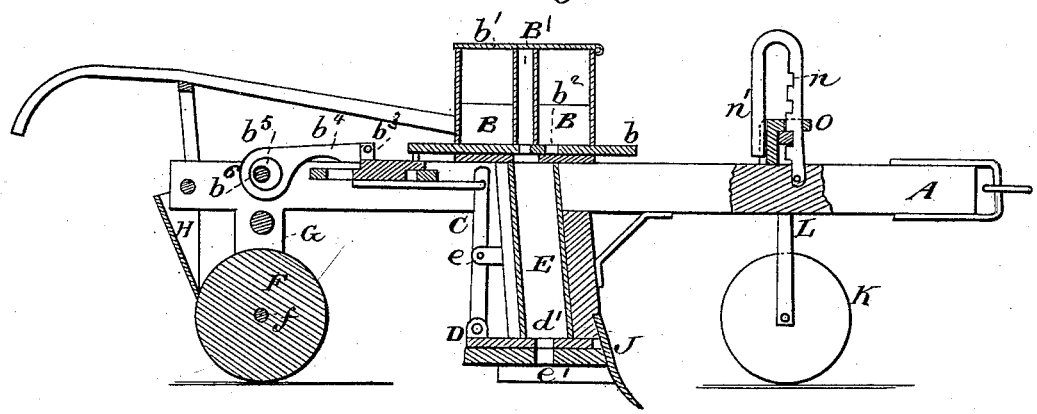

Figure 1 of the drawings is a plan view; Fig. 2, a side elevation, and Fig. 3 a longitudinal vertical section.

In the drawings, A represents the draft-beam, and B B two similar hoppers connected by an intermediate bottom-open chamber, B', into which a single seed-slide, $b$, for both hoppers brings alternately one of the seed-cups $b^2 b^2$. $b'$ is a single cover for both hoppers, hinged so as to work in the usual way. By this arrangement I can drill seed at one and a half foot apart in the row, and if it is desired to check-row at three feet each way one hopper is not used. The slide $b$ is pivoted to the sliding head $b^3$, as is the lever C, which moves the slide D at the bottom of the spout E, and said head is connected by the pivoted yoke $b^4$ with an eccentric, $b^5$, which is loose on the shaft $b^6$, but connects with a keyed clutch-slide, $b^7$, on said shaft, so that the latter may or may not operate the slides $b$ D.

The shaft $b^5$ is connected by the crank-disks $c$ $c$, pivoted bar $c'$, and pivoted guide $c^2$ with a shaft, $f$, of the ground-roller F, so that the latter may actuate the slides $b$ D. The roller-shaft $c^3$ is journaled in the angled frame-plates G G, and the scraper H is hung at the rear of the same to keep the surface of roller clean.

The sliding head $b^3$ has a forward prolongation, to which the upper end of the lever C is pivoted, while the latter is fulcrumed in the arm $e$, projecting rearwardly from the spout E. The latter communicates at the top with the chamber B' and with the opening $d'$ of slide D by means of the hole $e'$, while the side plates, I I, prevent the escape of seeds too much to one side, as they extend down to or nearly to the bottom of the furrow. At the front end of the space between these side plates is arranged the furrow-opener J.

By my invention it will be perceived that the seed is carried from the hoppers to the intermediate chamber, B', down the spout E to its bottom, and then dropped a distance of a few inches directly on the bottom of furrow, so that it reaches exactly the point wished in a continuous straight line from one end of a row to another. This is very important where the rows are only three feet apart or less, as otherwise it is impossible to work with a horse or mule between the rows without trampling upon or tearing up a good many plants.

K is the depth-gage wheel, which is journaled in the lower ends of the reversed-V frame L, which slides vertically in the beam-guides M M.

$n$ is a double-armed vertical bar fixed on the top of the beam A, and provided with the slide-bolt O. The frame L is placed in one of the notches $n$, while the grooved bolt O is carried down between the arm $n'$ and the frame L, so as to lock said wheel K at the desired altitude. In this way I can very accurately regulate the depth at which the seed is to be planted. By my invention the seed is thus surely put at exactly the right depth, at the precise required distance apart in the rows, and the rows of plants must necessarily come up in mathematically straight lines, so as to be conveniently worked without injury.

Having thus described all that is necessary to a full understanding of my invention, what I claim as new, and desire to protect by Letters Patent, is—

1. The combination, with the seed-slides $b$ D, of the vertical lever C, sliding head $b^3$, pivoted yoke $b^4$, eccentric $b^5$, shaft $b^6$, crank-disks $c$ $c$, connected by the pivoted bar $c'$, and the roller-shaft $f$, whereby both of said slides are operated by the ground-roller, as described.

2. The combination, with the depth-gage wheel, of the V-frame beam-guides, the notched bar $n$, and the sliding lock-bolt O, as and for the purpose specified.

In testimony whereof I affix my signature in presence of two witnesses.

BENJ. P. GREEN.

Witnesses:
JOSIAH NICHOLS,
L. C. DEAR.